United States Patent Office 3,151,133
Patented Sept. 29, 1964

3,151,133
3β-DIALKYLAMINOETHOXY ANDROSTENES
Edward W. Cantrall, Pearl River, Seymour Bernstein, New City, and Marvin J. Fahrenbach, Tomkins Cove, N.Y., assignors to American Cyanamid Company, Stamford, Conn., a corporation of Maine
No Drawing. Filed Nov. 21, 1962, Ser. No. 239,347
8 Claims. (Cl. 260—397.5)

This invention relates to new steroid compounds. More particularly, it relates to 3-substituted androstenes and androstadienes and methods of preparing the same.

The novel steroids of the present invention can be illustrated by the following formula:

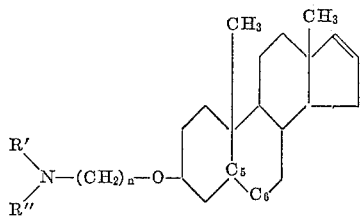

wherein R' and R" are lower alkyl radicals,

is a

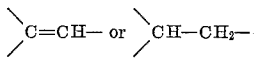

radical, n is an integer from 2 to 4, and mineral acid salts thereof, particularly the hydrochlorides and sulfates.

The above compounds are crystalline. The free bases are generally insoluble in water and somewhat soluble in the usual organic solvents such as chloroform or petroleum ether, whereas the mineral acid salts are soluble in water.

The compounds of the present invention are, in general, prepared by reacting a compound of the formula:

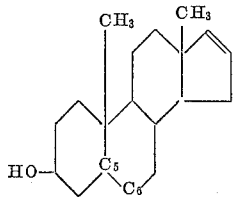

wherein —C$_5$—C$_6$ is as defined heretofore, with a compound of the formula:

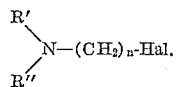

wherein R', R" and n are as defined above and Hal. is halogen. The reaction is preferably carried out in a solvent inert to the reactants such as tetrahydrofuran in the presence of potassium t-butoxide. The reaction mixture is heated to a temperature within the range of from 50° C. to 110° C. for from 30 minutes to 10 hours. Further treatment with a mineral acid produces the mineral acid salts.

Typical steroids prepared by the process of the present invention are: 3β-(β-dimethylaminoethoxy)-androst-5,16-diene; 3β(γ-dimethylaminopropyloxy)-androst-5,16-diene; 3β-(δ-dimethylaminobutyloxy)-androst-5,16-diene; 3β-(β-diethylaminoethoxy)-androst-5,16-diene; 3β-(β-dipropylaminoethoxy)-androst-5,16-diene; 3β(γ-diethylaminopropyloxy)-androst-16-ene; 3β-(β-dimethylaminoethoxy)-androst-16-ene; 3β-(γ-dipropylaminopropyloxy)-androst-16-ene; 3α-(β-diethylaminoethoxy)-etiochol-16-ene; and the like. Methods of preparing these compounds are described hereinafter in the examples.

The steroid compounds of this invention have shown activity in lowering blood cholesterol. Compounds with this activity are useful in treating hypercholesteremia.

The following examples describe in detail the preparation of representative 3-substituted androstenes and androstadienes of the present invention.

EXAMPLE 1

*Preparation of 3β-(β-Dimethylaminoethoxy)-Androsta-5,16-Diene*

To a solution containing 2.6 g. of androsta-5,16-dien-3β-ol (J. Am. Chem. Soc., 77, p. 4145 (1955)). in 200 ml. of tetrahydrofuran is added 2.3 g. of potassium t-butoxide. The resulting mixture is heated to reflux with stirring under nitrogen for one hour. Dimethylaminoethyl chloride (6 ml.) is added dropwise over about one hour. The mixture is refluxed an additional three hours, cooled, filtered and evaporated to an oil (2.3 g.). The latter is dissolved in ether and treated with hydrogen chloride. The crude hydrochloride (0.98 g.) is partitioned between water and ether. The aqueous phase is basified and the product is collected by filtration to give 0.60 g., melting point 64°–67° C. A sample for analysis is recrystallized from acetone-water and has a melting point 65°–67° C.

EXAMPLE 2

*Preparation of 3β-(β-dimethylaminoethoxy)-Androsta-5,16-Diene Hydrochloride*

An ethereal solution of 3β-(β-dimethylaminoethoxy)-androsta-5,16,diene (Example 1) is treated with hydrogen chloride to give the product of the example.

EXAMPLE 3

*Preparation of 3β-(γ-Diethylaminopropyloxy)-Androst-5,16-Diene*

Following the procedure of Example 1 and substituting γ-diethylaminopropyl chloride for β-dimethylaminoethyl chloride the product of the example is obtained.

EXAMPLE 4

*Preparation of 3β-(δ-Diethylaminobutyloxy)-Androst-5,16-Diene*

Following the procedure of Example 1 and substituting δ-diethylaminobutyl chloride for β-dimethylaminoethyl chloride there is obtained the product of the example.

EXAMPLE 5

*Preparation of 3β-(β-Diethylaminoethoxy)-Androsta-5,16-Diene*

Following the procedure of Example 1 and substituting β-diethylaminoethyl chloride for β-dimethylaminoethyl chloride the product of the example is obtained.

EXAMPLE 6

*Preparation of 3β-(β-Diethylaminoethoxy)-Androst-16-Ene*

Following the procedure of Example 1 and reacting β-diethylaminoethyl chloride with 3β-hydroxyandrost-16-ene (Helv. 27, p. 66 (1944)) the product of the example is obtained.

EXAMPLE 7

*Preparation of 3β-(γ-Diethylaminopropyloxy)-Androst-16-Ene*

Following the procedure of Example 1 and reacting γ-diethylaminoethyl chloride with 3β-hydroxyandrost-16-ene give the product of the example.

We claim:
1. A compound selected from the group consisting of:

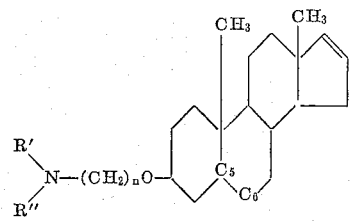

in which R' and R" are lower alkyl,

is selected from the group consisting of

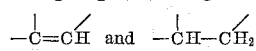

and $n$ is an integer from 2 to 4, and its mineral acid salts.

2. The compound 3β - (β - dimethylaminoethoxy)-androsta-5,16-diene.
3. The compound 3β - (β - diethylaminoethoxy) - androsta-5,16-diene.
4. The compound 3β-(β-diethylaminoethoxy)-androst-16-ene.
5. The compound 3β-(γ - diethylaminopropyloxy)-androsta-5,16-diene.
6. The compound 3β - (δ - diethylaminobutyloxy) - androsta-5,16-diene.
7. The compound 3β-(γ - diethylaminopropyloxy)-androst-16-ene.
8. The compound 3β - (β - dimethylaminoethoxy)-androsta-5,16-diene hydrochloride.

No references cited.